(12) United States Patent
Tortoriello et al.

(10) Patent No.: US 10,634,646 B2
(45) Date of Patent: Apr. 28, 2020

(54) ACOUSTIC FREQUENCY BASED SYSTEM WITH CRYSTALLINE TRANSDUCER MODULE FOR NON-INVASIVE DETECTION OF EXPLOSIVES, CONTRABAND, AND OTHER ELEMENTS

(71) Applicant: GTBM, Inc., East Rutherford, NJ (US)

(72) Inventors: Vincent Tortoriello, West Caldwell, NJ (US); Richard Picolli, Rutherford, NJ (US)

(73) Assignee: GTBM, Inc., East Rutherford, NJ (US)

( * ) Notice: Subject to any disclaimer, the term of this patent is extended or adjusted under 35 U.S.C. 154(b) by 0 days.

(21) Appl. No.: 16/396,668

(22) Filed: Apr. 27, 2019

(65) Prior Publication Data

US 2019/0310230 A1 Oct. 10, 2019

Related U.S. Application Data

(63) Continuation-in-part of application No. 15/530,906, filed on Mar. 21, 2017, now Pat. No. 10,317,369.
(Continued)

(51) Int. Cl.
| | |
|---|---|
| *G01N 29/04* | (2006.01) |
| *G01N 29/12* | (2006.01) |
| *G01N 29/22* | (2006.01) |
| *G01N 29/24* | (2006.01) |
| *G01N 29/42* | (2006.01) |
| *G01N 29/44* | (2006.01) |

(Continued)

(52) U.S. Cl.
CPC ........... *G01N 29/043* (2013.01); *G01N 29/12* (2013.01); *G01N 29/221* (2013.01); *G01N 29/245* (2013.01); *G01N 29/343* (2013.01); *G01N 29/42* (2013.01); *G01N 29/4418* (2013.01); *G01V 1/001* (2013.01); *G01N 2291/101* (2013.01); *G01N 2291/102* (2013.01)

(58) Field of Classification Search
CPC .... G01N 29/043; G01N 29/12; G01N 29/221; G01N 29/245; G01N 29/343; G01N 29/42; G01N 29/4418; G01N 2291/101; G01N 2291/102
USPC .......................................................... 73/629
See application file for complete search history.

(56) References Cited

U.S. PATENT DOCUMENTS

| | | | | |
|---|---|---|---|---|
| 5,600,303 | A | * | 2/1997 | Husseiny ................ F41H 11/12 340/568.1 |
| 5,767,407 | A | * | 6/1998 | Sinha .................. G01N 29/036 702/54 |

(Continued)

*Primary Examiner* — Natalie Huls
*Assistant Examiner* — Monica S Young
(74) *Attorney, Agent, or Firm* — Robert Gorman; Gorman Law Offices (57) ABSTRACT

The present invention relates to a system and method for molecular and/or atomic level detection of elements forming contraband such as concealed explosives, drugs, smuggled goods, etc., through the use of an acoustic frequency detector having a crystalline transducer module and elemental and mass comparator. The present invention can be employed in a non-destructive manner for the mobile and stationary inspection of objects such as luggage, persons, containers, etc., through a combination of computer-aided techniques and algorithms combined with a crystalline and oil enhanced transducer that, upon return of a system-generated acoustic signal, are used to screen and confirm explosive threats and/or other contraband.

10 Claims, 5 Drawing Sheets

Related U.S. Application Data (60) Provisional application No. 62/499,367, filed on Jan. 20, 2017.

(51) Int. Cl.
  *G01V 1/00* (2006.01)
  *G01N 29/34* (2006.01)

(56) References Cited

U.S. PATENT DOCUMENTS

| | | | |
|---|---|---|---|
| 7,151,447 B1 | 12/2006 | Willms | |
| 7,246,522 B1* | 7/2007 | Diaz | G01N 29/07 73/52 |
| 7,319,639 B2 | 1/2008 | Douglass et al. | |
| 9,404,899 B1* | 8/2016 | Konopka | G08B 13/1609 |
| 2002/0159334 A1* | 10/2002 | Caulfield | G01N 29/348 367/87 |
| 2004/0035208 A1* | 2/2004 | Diaz | G01N 29/024 73/597 |
| 2007/0093702 A1* | 4/2007 | Yu | A61B 5/14551 600/326 |
| 2008/0085212 A1* | 4/2008 | Adams | G01N 29/036 422/50 |
| 2008/0242997 A1* | 10/2008 | Lynch | G01N 29/07 600/455 |
| 2008/0289427 A1* | 11/2008 | Brandt | G01H 9/00 73/643 |
| 2009/0027280 A1* | 1/2009 | Frangioni | A61K 49/0032 343/703 |
| 2010/0320372 A1* | 12/2010 | Blick | G01N 23/00 250/282 |
| 2011/0004091 A1* | 1/2011 | Brooks | A61B 5/0093 600/407 |
| 2014/0164629 A1* | 6/2014 | Barth | H04L 67/141 709/227 |
| 2015/0107361 A1* | 4/2015 | Pirkle | G01N 29/02 73/632 |
| 2015/0285941 A1 | 10/2015 | Radley et al. | |
| 2016/0123933 A1* | 5/2016 | Fetzer | G01N 29/225 73/634 |
| 2016/0274067 A1* | 9/2016 | Walker | G01N 29/4418 |
| 2017/0128042 A1* | 5/2017 | Desai | A61B 8/4281 |
| 2019/0290253 A1* | 9/2019 | Trabish | A61B 17/025 |

\* cited by examiner

Acoustic Freq. Detector Tip  Transducer  Pulse Receiver  A/D Converter  Computer Chip and output

ACOUSTIC FREQUENCY BASED SYSTEM WITH CRYSTALLINE TRANSDUCER MODULE FOR NON-INVASIVE DETECTION OF EXPLOSIVES, CONTRABAND, AND OTHER ELEMENTS

The present application is a continuation in part of, and claims priority from application Ser. No. 15/530,906, filed on Mar. 21, 2017, which itself claims priority from U.S. provisional application No. 62/499,367, filed on Jan. 21, 2017, both of which are hereby incorporated by reference in their entirety.

BACKGROUND OF THE INVENTION

Acoustic frequency detection and wave-based systems are known in manufacturing and oil industries for imaging and non-destructive evaluation (NDE) of materials. Such systems may involve the propagation of energy through solids, liquids, and gases as waves; typically, a pulse of energy is applied to an object to be imaged and reflected waves of the pulse are detected and processed for imaging. The spatial relationship and amplitude of the reflected waves provide imaged information as to the location and nature of structures that reflected the acoustic energy in the object being analyzed.

NDE of objects for detection of contraband and/or explosives is known according to some specific approaches. Such NDE approaches may include acoustic frequency detection or vision-based systems such as infrared, Millimeter Wave (MMW), multispectral, hyperspectral, infrared, X-ray, or imaging radar output. However, such systems have significant limitations. For example, these systems rely on data to reconstruct the object or elements in a visual format so a human or software can attempt to identify the objects. They also have limited penetration capabilities.

Likewise, other systems, such as MMW and imaging radar systems are similarly limited in penetration of certain materials and is also based on imagery. Separately, infrared sensing systems can be impractical due to very small temperature contrasts that may exist between hidden contraband and outer layers of covering material of a given container Although X-ray and magnetic portal detector systems have proven much more effective at detecting both metallic and non-metallic concealed weapons than some of the above systems, such "portal" detection technologies are inherently limited by the X-ray replies on images. Magnetic portals rely on magnetic energy to disturb the object in an attempt to try and identify it, and at any rate, do not necessarily identify the object at a molecular level nor does any of the NDE techniques cited in these examples.

In each of the above cases, do not detect disparate categories of contraband, whether narcotics, smuggled gems, illicit quantities of cash on a molecular level, various chemical categories of explosives, or biological agents. Accordingly, known approaches are limited in terms of protective applications utilizing images, and none of the examples can operate in a mobile field environment without images.

SUMMARY OF THE INVENTION

Methods and apparatus are described for acoustic wave detection of elements and elemental analytes. To this end, the present invention relates generally to methods of utilizing acoustic energy produced from novel crystalline and oil/water enhanced transducers, more particularly to methods of using such acoustic energy for mobile and stationary detection of explosives, contraband, and other elements at a molecular level by detecting the molecular signatures of desired or "flagged" elements and the analytes thereof which are then compared to these molecular signatures that are predetermined or stored in a library having all the elements of interest based on an ultrasonic acoustical wave. Unlike known ultrasound and other similar systems, the present invention utilizes a novel crystalline, oil/water-suspended piezoelectric transducer to generate acoustic wave pulses that transmitted into the object to be analyzed and subsequently, to detect reflected echo waves returned to the transducer.

The present invention offers short/long-range detection of materials containing certain "flagged" elements, such as carbon and other atoms or molecules of interest that may indicate explosives or other elements of interest. Unlike other technologies, the present detection system can discriminate among different types of atoms and molecules. For example, where an element such as carbon and sulfur (in the case of explosives detection field of use) has been pre-programmed in the given field of use as a "flagged" element, the system can accurately identify carbon and sulfur, because the response from each carbon and sulfur compound that it detects has a unique acoustic ultrasonic atomic or molecular signature.

More specifically, the invention contemplates, in achieving the above, the use of a wand or other similarly portable means of identifying the presence of various types of elements in a non-invasive fashion through use of special purpose analysis unit comprising hardware and software configured for processing and comparing the molecular signatures with known elemental flags, signatures, such as carbon, sulfur, potassium, etc. However, the inventive system offers features which also make it viable for use in detection of non-explosive materials, such as biological aspects, narcotics, illegal contraband such as smuggled gems or currency, etc., based upon the respective molecular elemental signatures given off when an ultrasonic wave is passed through them.

One method of the present invention therefore includes an oil/water-based crystalline suspension transducer, operatively positioned as part of a head or wand terminus of an acoustic detector, for the purpose of transmitting an output signal. Once the output signal has passed through the object and the reflected echoed of the existing target object materials is received back at the detector head.

In affording the above, the present invention therefore provides for the following beneficial advances relating to: (1) Provision of a molecular detection hardware module for non-invasive mass analysis of derived molecular ultrasonic signatures that are compared, utilizing a novel molecular-level ultrasonic signature software, that has stored in it many different resonating frequencies for each respective element or molecule that makes up the unique signature of all these elements or molecules, for comparative analysis; (2) Provision of the entire system (or, in other embodiments, substantially the entire system) in a portable, dust-proof and shock proof contained wand-based system or stationary; (3) Provision of the molecular detection module having novel sensor surfaces, either chemical vapor deposition process metallicized surfaces, or novel oil/water-suspension ceramic crystals; (4) by providing an optional sealed oil/water suspension tip to propagate acoustic waves without the need for physical contact with a given subject item; and (5) Provision of a stationary or mobile system with optional detachable wand. By contrast, no known system affords these advantages without imagery at a molecular level, and accordingly, the present invention overcomes the aforementioned and other disadvantages inherent in the prior art, that rely on magnets, spectral light and imaging.

BRIEF DESCRIPTION OF THE DRAWINGS

FIGS. 2 A-2B are exemplary diagrams of a wand of the present inventive system, illustrating one embodiment of the novel crystalline oil suspension tip wand terminus and connected counter, calculator and interface(s);

DETAILED DESCRIPTION OF THE INVENTION

In terms of potential fields of application, the present invention relates to inspection systems such as those used to inspect luggage, packages or other target objects to determine the presence of contraband such as explosives, weapons, drugs, or any object or substance at a molecular level. A more specific example is the inspection of luggage that is to be checked onto airline flights or carried onto an airplane. In one aspect the invention relates to the use of acoustic ultrasonic waves for the detection of explosives or other contraband at a molecular level, such as may be concealed in said target objects.

Figure 1:
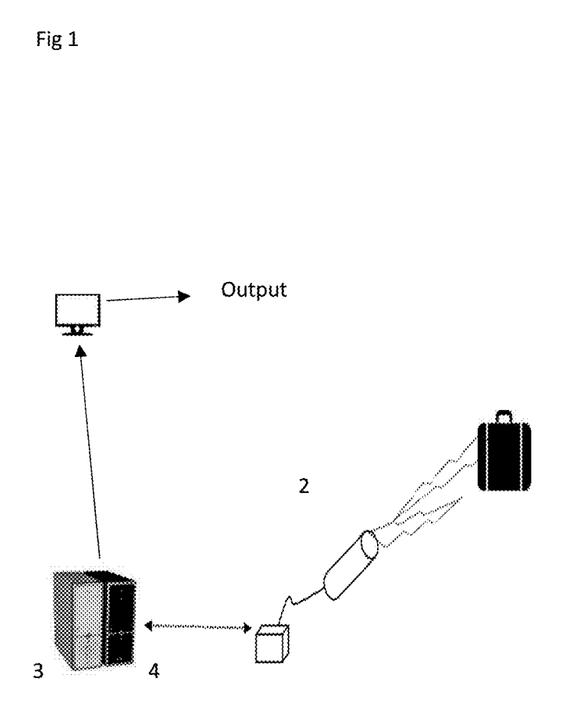
FIG. 1 is a block diagram of an acoustic frequency detection system comprising the present invention being used in an illustrative operating environment on a target object.

FIG. 1 illustrates an acoustic wave system 10 for analyzing an examination object or target 15 with acoustic energy comprising an acoustic frequency module 20, alternatively referred to herein as acoustic frequency detector 20, a signal processing assembly 30, and a display and analysis module 40. Acoustic frequency detector 20 is acoustically coupled to or directed at target object 15 such that acoustic energy is both transmitted from, and when reflected from target object 15, received by acoustic frequency detector 20. In one example of the present invention, acoustic frequency detector 20 may be adapted so that when reflected from target object 15, acoustic energy incident on the transmit/receive surface of wand 21 registers a modulation in an electronic array. This modulation is converted to a readout signal emanating from acoustic frequency detector 20 (wand 21), which in turn is operatively connected to signal processing assembly 30, such that a processed output signal corresponding to the received acoustic energy is generated for conversion by signal processing assembly 30. Display 2 and analysis module 40 is operatively connected to processing assembly 30 so that the processed output signal is analyzed. Unlike various acoustic based systems (such as ultrasound) which rely on imagery not currently utilized for molecular detection, the present invention is acoustic wave based, and includes the novel crystalline oil/water suspension-based wand 21 that need not be physically touching target object 15. The intention is to generate a signal having a frequency narrow enough to reach the object within, in one embodiment, a certain fine-tuned range from that object. In some cases, this acoustic energy may spread out upon penetration of the materials making up target object 15, and will be reflected back to transmit/receive surface wand 21.

Wand 21 of acoustic frequency detector 20 therefore need not touch the object, but can be just swiped near objects such as luggage. The proper wavelength and frequency of the wave to encompass the entire given target object may vary depending on what restricted material is being sought (e.g. cash, narcotics, gems, precious metals, or type of explosive) and its chemical and molecular composition or "signature". Exactly which wavelength or frequency to be used can be calculated from the known molecular composition of any given target object 15, such that if say, explosives are being targeted, then typical elements such as Na or K are calculated so that the return frequency can be compared with the signature found in the library as discussed hereafter. Additional factors or settings such as power, amplitude, materials, and the like are configured based on the type of detection required for the aforementioned processes once transducer 25 of the inventive system has been fine tuned in a given field application as described herein because the inventive approach is to employ an initial wave for penetration of target object 15, and based upon the response thereto, a second wave may be generated at a maximized distance therefrom so as to transmit the second wave to penetrate within target object 15 and bounce or reflect from whatever material(s) may be detected therein. Accordingly, the fine tuning may be accomplished by employing a device such as an oscilloscope to determine the maximum practical distance of use away from the surface(s) of target object 15 to be scanned in the field of use, as well as by the size and/or particular type of material(s) that target object 15 is comprised of, in addition to the aforementioned signature setting. In one embodiment, such fine tuning and adjustments can be made with the assistance of an oscilloscope that will indicate when the wave parameters and/or distance of usage is such that accuracy is being compromised by lack of usable data. For example, the illustrative oscilloscope will indicate frequency and wavelength upon setting the oscilloscope to detect the resonant frequency of nitrogen (whether liquid and/or solid). The range of the oscilloscope can be adjusted to just look for target frequency ranges. In this illustrative case, the resonant frequency of the atom nitrogen has a frequency of 28.905 MHz (something which is understood by those skilled in the art to be well documented by nuclear magnetic resonance sampling), and as such, a user setting the initial fine tuning can set the oscilloscope to detect the wave forms that are detected only in the frequency range of say, 20 to 30 MHz. With this approach in mind, the user doing the initial fine tuning can then start detecting the presence of such wave forms, and if the detector finds a match, the oscilloscope will reveal this by matching the frequency and waveform that is returning, and in order to make sure the waveform and frequency are a match, the user that executes the initial fine tuning can also adjust the detector itself, using the oscilloscope to lock down the optimal distance of the inventive acoustic wave system 10 from target object 15. Consequently, once the user has fine-tuned the settings and distance, illustrative boundaries from target object 15 may be termed the "range of detection" or "range of use" for one given field of application. However, one skilled in the art can nevertheless appreciate that these parameters can vary depending on field of use, such that the "range of detection" or "range of use" for other given fields of application may very well differ accordingly. Considering this dynamic, the aforementioned parameters can therefore be easily adjusted to match the proper range of detection. In one alternative embodiment involving exemplary usage of detection of explosives in airline luggage as further described hereafter, the effective maximum range for useful readouts for detections of nitrogen (N) based signatures, or as otherwise may be determined.

Figure 2A:
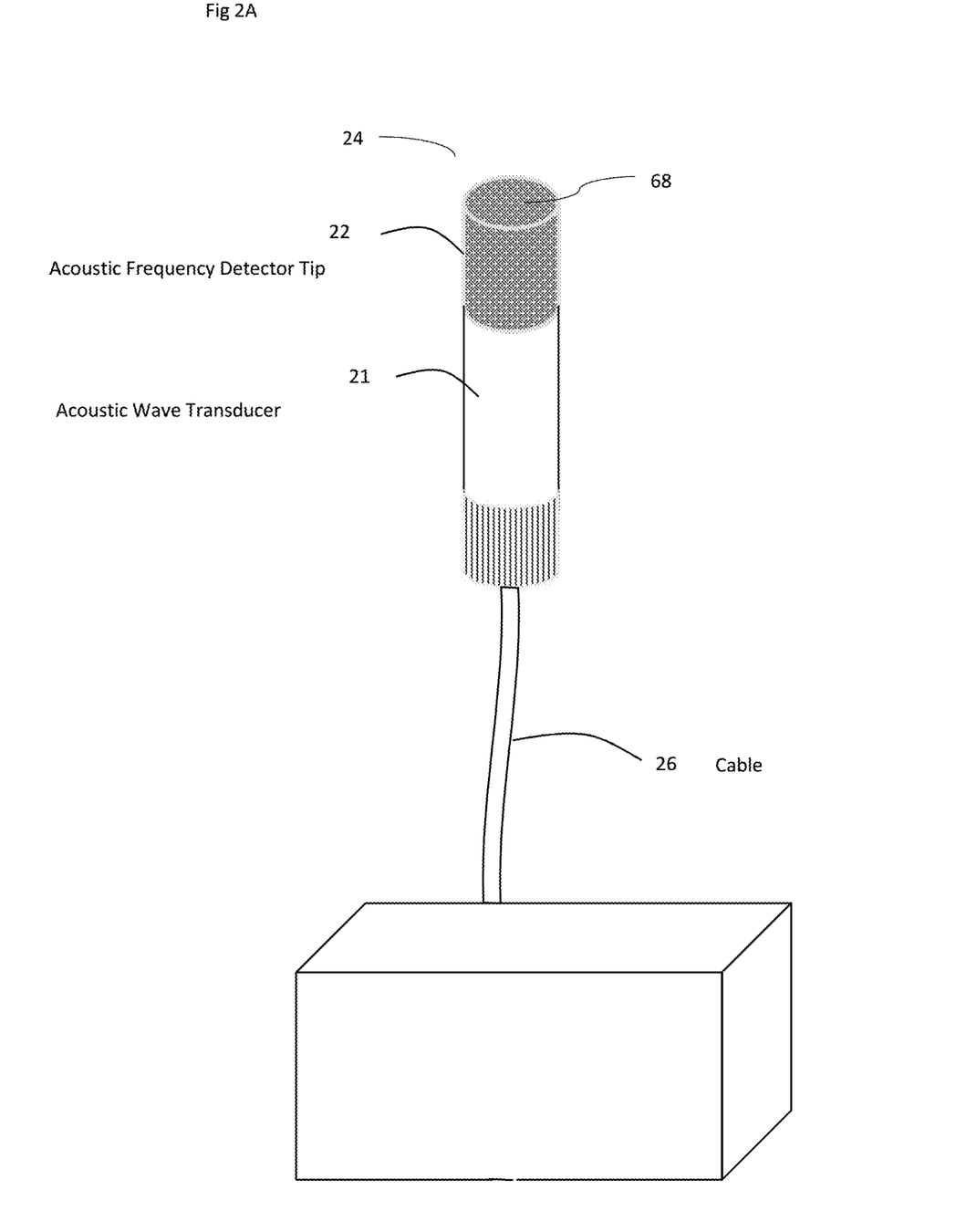

With reference to FIG. 2A a simple configuration of an acoustic frequency detector 20 made up of a fixed transmitter/detector array (transmit/receive surface) 68' at tip 22 of wand 21, coupled via connection 26 with an pulse receiver 28 via transducer 25 (as seen hereafter in FIG. 2B) that is emitting acoustic waves at 24 (output signal) which will thereafter be reflected back at 24 to array 68' of acoustic frequency detector 20. Once so provisioned, echo 24 will offer the inventive system 10 all the information needed for properly scanning and outputting an analysis of the presence (or absence) of any flagged materials within target object 15. Essentially, and as further shown in FIG. 2B, signal returns to acoustic frequency detector 20 are passed on to transducer 25 to special purpose signal processing assembly 29 in order to convert the signal(s) from an analog acoustic wave to a digital acoustic wave as output at 29'. When a pulse (acoustic wave that has been originally outputted) is transmitted, the resulting echo that is reflected back from the element(s) within the target object 15 typically contains numerous various amplitudes. These amplitudes are in an analog format (the raw data in analog format cannot be processed by the algorithms) are digitized by the analog to digital converter which is essential so that the algorithms are able to analyze and process all the data in the proper format, These amplitudes can typically number in the thousands based on the configurations.

Figure 2B:
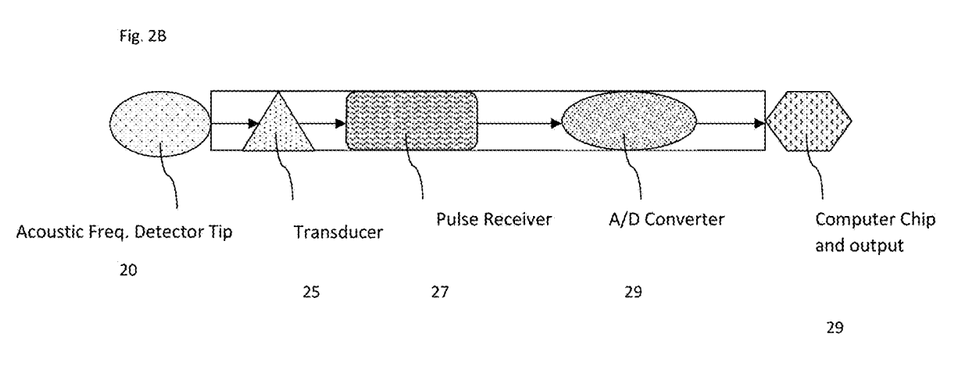

Unlike known systems such as Infrared (IR) and Nuclear Magnetic Resonance (NMR) and others which narrowly focus on one frequency for elemental detection, and utilize invasive methods such as magnetic or light, the present invention does exactly the inverse of this type of approach, in that it purposely avoids (as much as possible) the extreme narrowing or focus on a single frequency and instead focuses on capturing as much data from the returns as feasible, which in the present inventive case are comprised of the numerous various amplitudes which can thereafter be compared to the signatures found in the library, once the library is built or established for each given element, as further described hereafter. Once the multitude of amplitude values from at least one echo are received, each individual amplitude value is then converted by an analog to digital converter and novel application of some known engineering principles, such as with a Fast Fourier Transformation (FFT). An FFT converts the amplitude values to frequencies across the spectrum. Specifically, this is done through special purpose processing techniques found within special purpose signal processing assembly 29, which in one illustrative example does not necessarily use FFT directly, but instead employs a power spectrum algorithm that might use FFT indirectly. According to one possible algorithmic-based embodiment, the raw signal is first de-noised using say, a wavelet transformation or the like, and then calculates the most prominent waveform out of the return using empirical mode decomposition. After that, one embodiment might use a spectral analysis, such as a "Pwelch" function which estimates the power observed across the spectrum for the signal of any given return. Once the inventive approach as described above narrows down the valid frequencies, then special purpose signal processing assembly 29 processes those frequencies and compares the frequency values being returned to predetermined ultrasonic frequency signatures for the elements that a user is trying to identify.

In establishing the predetermined ultrasonic frequency signatures for elements, an initial calibration process is often necessary. For example, the typical range of elements that comprise contraband and/or explosives are found within the range of 0-400 Mhz. By way of example, carbon is often reflecting a frequency of 100.580 MHz, as one of the signatures which can be initially established by purposely placing a sample of pure carbon within a target object 15, and receiving and processing the resulting echo in accordance with the invention. However, in practice, the (carbon) materials of target object 15 may obscure this result somewhat when compared with the presence of just carbon by itself (not covered). By and large, this muting effect can be controlled for by extensive initial testing across different target objects 15 covering scenarios, leading to a statistically and scientifically valid range of values or signatures for each element. In addition, any given single element may give out multiple, and in some cases, numerous frequencies when exposed to an ultrasonic wave that can form an identifiable number of distinct frequency bands.

By way of illustration, the above referenced carbon, in this case, an exemplary carbon 8 sample has the following frequency signature as a reference return:

Carbon 8 Frequency Return (in ordered sequence), per reference scan:

| 6.47 MHz | 7.14 MHz | 7.98 MHz | 8.74 MHz | 9.49 MHz | 10.42 MHz | 11.09 MHz | 11.93 MHz |
|---|---|---|---|---|---|---|---|
| 16.04 MHz | 16.21 MHz | 17.10 MHz | 18.73 MHz | 58.13 MHz | 81.98 MHz | 83.50 MHz | 85.62 MHz |
| 94.68 MHz | 95.34 MHz | 98.88 MHz | 102.98 MHz | | | | |

When done in accordance with the above, a predetermined "reference library" of values can be used and reused for a baseline comparison in the overall elemental analysis step. Moreover, this series can be used to project a checksum through one or more means such as the number of bands (in the above scan, 20 bands are present). As can be appreciated, it would be very unlikely that a false positive could be returned when all of these checksum values are compared. In some case, it may be helpful to use only some of these checksum return attributes, especially in cases of distorted or muffled returns that may be received because of the target element(s) being encapsulated or covered with noise reducing materials or baffling. In such cases, the frequencies may very well be reduced or otherwise altered, but the number of bands in total would normally be the same number.

In one embodiment of the invention an echo sounder (not depicted) within transducer 25 can calculate the time difference between a transmit pulse and the return echo and can be easily understood by the user or computer. More specifically, for the echo sounder in computations within the context of say, linear media, any wave pattern can be described in terms of the independent propagation of sinusoidal components. The wavelength λ of a sinusoidal waveform (wavelength) traveling at constant speed v is given by λ=c/f where v is the phase speed (magnitude of the phase velocity) of the wave and f is the wave frequency. In a dispersive medium, the phase speed itself depends upon the frequency of the wave, making the relationship between wavelength and frequency nonlinear. In the case of electromagnetic radiation, the phase speed is close or approximately the speed of light, about $3 \times 10^8$ m/s. Thus, the wavelength of say, a sound wave that is 30 Hz, is determined to be 5 meters when calculated in accordance with the above equation that relates wavelength as being equal to the speed of wave (e.g., approximately that of light), divided by the frequency. Once this is determined, the echo sounder can back calculate to get both frequency and wavelength through use of $E=h\nu$ where E=energy, h=Planck's constant=$6.626\times 10^{-34}$ J·s and $\nu$=frequency. The echo sounder may employ a second equation, the wave equation, which describes the speed of light in terms of wavelength and frequency: $c=\lambda\nu$; where c=speed of light=$3\times10^8$ m/sec, $\lambda$=wavelength, and $\nu$=frequency, but rearranges the equation to solve for frequency: $\nu=c/\lambda$. Next, the echo sounder replaces frequency in the first equation with $c/\lambda$, to get a formula by using: $E=h\nu$; and $E=hc/\lambda$, and by plugging in the following values to derive the mass: $E=6.626\times10^{-34}$ J·s$\times3\times10^8$ m/sec/(633 nm$\times10^{-9}$ m/1 nm); and $E=1.988\times10^{25}$ J·m/$6.33\times10^{-7}$ m $E=3.14\times^{-19}$ J.

Figure 3:
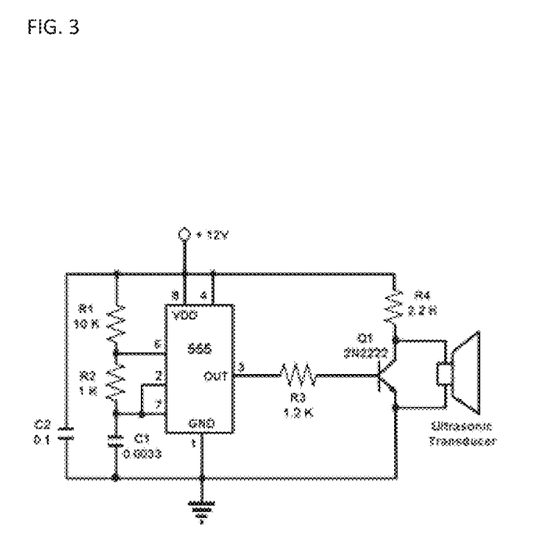
FIG. 3 is an electronic schematic diagram of an acoustic frequency propagator and detector illustrating another embodiment of the present invention.

FIG. 3 illustrates one possible variant of an electronic schematic diagram of acoustic frequency propagator and detector 20, essentially an acoustic wave generator and receiver. The acoustic waves generated therefrom may take various forms, whether acoustic surface, guided, shear, compressive, or bulk waves. At least one acoustic wave is first propagated through the material of the target, and a reflection or return of the acoustic wave is detected, and an acoustic wave parameter is determined therefrom. This parameter is then converted by a value signal processing assembly (analog to digital converter) 30 into a signature that illustratively, after graphical (frequency versus occurrence) analysis may be compared against a library of know signatures for these elements and molecules which is a look up table (standard as defined by the above-described "reference library"), as further delineated illustratively hereafter in FIG. 4) of signatures of various elements and their analytes. As will be discussed hereafter in regards to FIG. 8, any false positive analysis (checksum, defined hereafter) will be conducted once this signature determines the presence of a given "flagged" element (if present). To this end, further computations can be run by a special purpose processor circuit (not depicted) having instructions configured to differentiate between false positives as detailed in FIG. 8.

Figure 4:
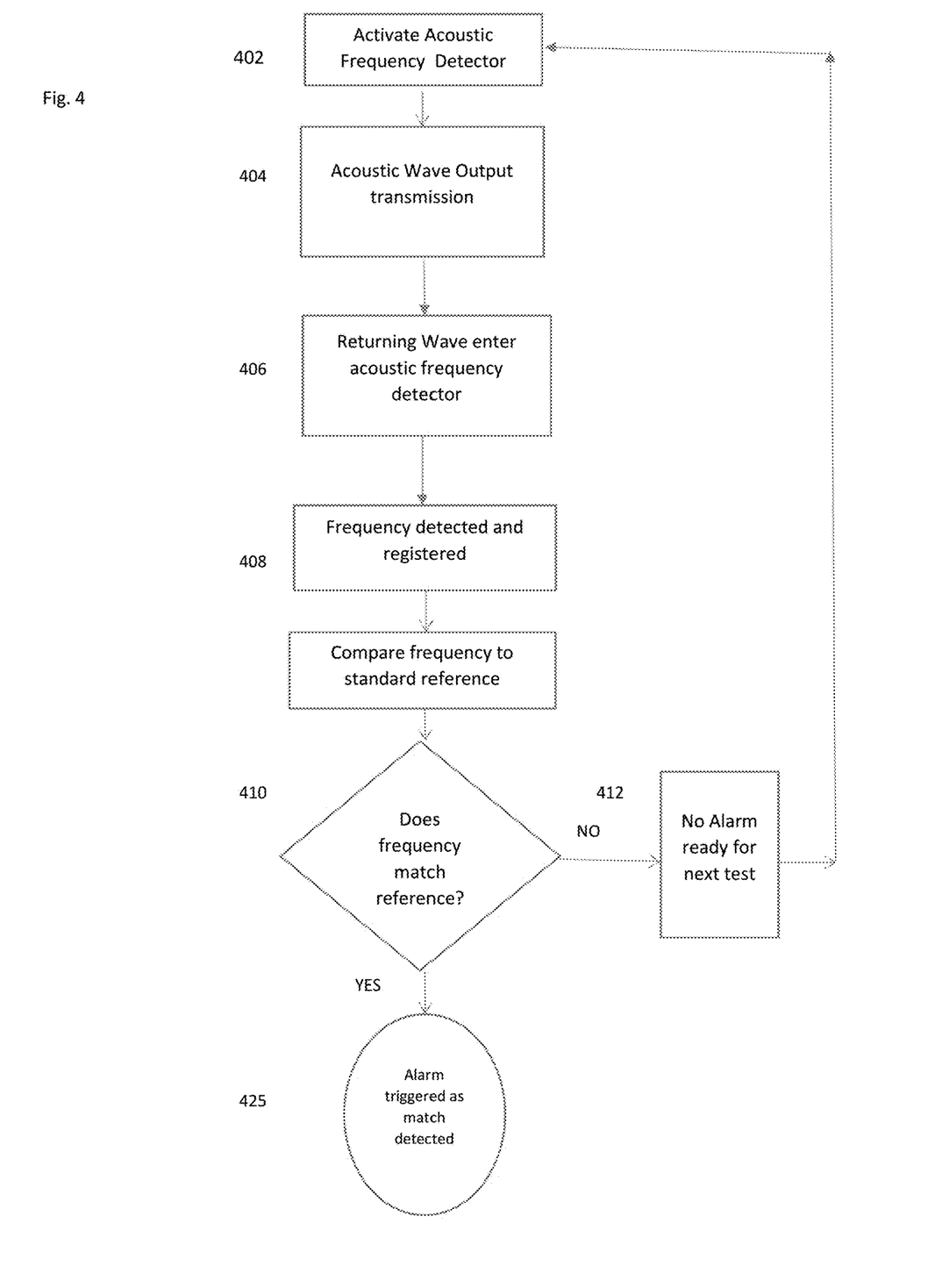
FIG. 4 is a flow diagram indicating illustrative instructions for the special purpose circuit configured to differentiate between false positives amongst signatures of "flagged" elements, illustrating yet a further embodiment of the present invention.

FIG. 4 details an illustrative flow process rendering instructions for the special purpose circuit 29" configured to differentiate between false positives amongst signatures of "flagged" elements. As detailed therein, acoustic frequency detector 20 is activated at step 402, which generates an acoustic wave at 404 for propagation to and within material(s) of target object 15, the process of which ultimately yields a reflected wave which returns to surface 68' of acoustic frequency detector 20 for frequency measurement at step 406. Any frequency or frequencies are then compared to a unique database of frequencies that includes all the elemental frequencies of interest that make up the unique signatures for all elements and in one embodiment would be the frequency signature output of say based on an ultrasonic wave, carbon, which has a well-known signature of frequencies that returns specific frequency signatures at step 410, and if a given frequency does match the respective flagged material(s) frequency, then an alarm is triggered. The signature of carbon exhibits what is termed peaks of relative abundance at 98.88 MHz, 16.04 MHz, and 11.09 MHz by example with many additional frequencies and it is these peaks that may be employed as its signature because no other element exhibits these same peak combinations. As such, this signature offers a useful way of analyzing the returning input wave, and also, offers the feature of an output that can be transmitted to a special purpose computer chip that acts akin to a "Traffic Cop" that directs the flow of signal data for processing, such that "permitted flows" are those that are detected signals that are compared to the library of unique signatures of these elements and molecules.

FIG. 6 details a yet more advanced and innovative variant 60 of transducer 25, connected via connector 61 to acoustic wave system 10. Therein, one embodiment entails provision of an encased electrical shield 62, acoustic insulator 63, damping element 64, and illustratively, PZT, or lead zirconate titanate (Pb[Zr(x)Ti(1−x)]O$_3$), is a piezoelectric ceramic material that, when fired, has a perovskite crystal structure, each unit of which consists of a small tetravalent metal ion in a lattice of large divalent metal ions. In the case of PZT, the small tetravalent metal ion is usually titanium or zirconium. The large divalent metal ion is usually lead. Under conditions that confer a tetragonal or rhombohedral symmetry on the PZT crystals, each crystal has a dipole moment. PZT materials, and piezoelectric materials more generally, exhibit a unique range of properties. In a basic sense, if a piezoelectric material is deformed, an electric charge is generated in what is known as the piezoelectric effect. The opposite of this phenomenon also holds true: If an electric field is applied to a piezoelectric material, deformation occurs in what is known as the inverse piezoelectric effect. In comparison to other metallic oxide based piezoelectric material barium titanate (BaTiO3), PZT materials exhibit greater sensitivity and can handle higher operating temperatures. To this end, in one embodiment of acoustic wave system 10, PZT materials are employed so that when active, will not overheat or be affected by temperature. As such, provided therewith are PZT (active element) 65, 66, matching layer 67 forming array 68 for propagation 68' of electrical energy into waves and reception of acoustic waves 69. Typically, matching layer 67 will be structured to form ¼λ of the wavelength of a return in one embodiment. Similarly, PZT 65, 66 will be structured to form ½λ of the return wave, which is then modified as it passes through transducer 25, in order to fine tune the output and so as to penetrate what is being examined or detected in target object 15.

With the above operation in mind, and with ongoing reference to FIGS. 1, 2A-2B, 4, and 7, a "flagged" element such as carbon might be detected through use of a penetrating beam of acoustic frequency after passing through, and being reflected from, target 15 (e.g., baggage or person as seen in FIG. 1), where the processing steps of determining the signature of the flagged carbon, when compared to the "reference library", generates an alarm that carbon has been detected, as further detailed hereafter in FIG. 4. As can be seen in FIG. 8, a second part of the "bifurcated double verification" that eliminates false positives during flagging of materials of interest begins with the acoustic wave transmission at step 81, whereupon the returning wave reaches transducer 25 at 82, and the signature is detected then registered at 83, with subsequent comparison to the "reference library" at 84 via said specialized software. Thereafter, a determination is made as to whether the frequency matches the standard reference value at step 85, such that if the comparison does not match, a false positive signal (no alarm) is indicated, for ultimate restarting of the overall process, and where the comparison does, the signal continues along the process for alarm resolution. Essentially, the following steps are therefore executed in one illustrative embodiment, and that can be done for many various elements: (i) using a special purpose signal processing assembly to analyze multiple amplitudes within at least one echo result(s) so as to compute a unique frequency for each one of the multiple amplitudes within each echo result(s); (ii) parsing each one of the (at least one) echo result(s) respectively into (at least one) separate frequency band(s); (iii) comparing the frequency bands with (at least one) predetermined baseline band (reference value, optionally from the "library") for (at least one) element identification assignment; (iv) and outputting (at least one) element identification assignment, when a given said frequency band has a value that is within a predetermined range of a given said baseline band for a given element, as to reduce noise. As illustratively provided, a predetermined range of a baseline band may be some statistically acceptable deviation that is allowable for interference and/or muffling of sounds, perhaps on the order of ±8-11%, although this too may vary, given the actual subject frequency, as not all frequencies are necessarily muffled at the same rate. In cases where the reduction in ultrasound returns is statistically unacceptable, one optional approach is to use one or more anisotropic, acoustic complementary metamaterials (CMM) and their application in restoring acoustic fields distorted by aberrating layers, as detailed in Anisotropic Complementary Acoustic Metamaterial for Canceling out Aberrating Layers Chen Shen, Jun Xu, Nicholas X. Fang, and Yun Jing Phys. Rev. X 4, 041033, Published 19 Nov. 2014, the entirety of which is hereby incorporated by reference.

One optional feature is that of a check sum ("chksum") step or module that takes a known procedure such as say, elements from the MD5 checksum based on the GNU MD5 code implementation in Unix, or where a comparison is done on a suspect file (in this case, a band of the frequency as returned, potentially over noisy transmission lines of sight or which are muffled by packaging of target object 15 covering or encasing a target element) and applies such techniques to the returns algorithmically. The comparison is made against an exact copy of a trusted file and can be made band-for-band, or against the total number of bands received (or even the mean or mode of the various bands), but either way it is checked against the library, so it is unlikely that an accidentally damaged file will produce the same chksum as the original file. In any case, the checksum module takes a known approach and uses it in a novel application, to wit, in an ultrasound-based frequency processing and amplitude conversion approach to detecting hidden elements in verifiable, repeatable fashion. Provision of such protocol avoids many false positives and the resulting loss of confidence that may be encountered otherwise.

Accordingly, the motion of any given acoustic wave will be affected by the medium through which it travels. Thus, changes in one or more of four easily measurable parameters associated with the passage of a high frequency sound wave through a material transit time, attenuation, scattering, and frequency content can often be correlated with changes in physical properties such as hardness, elastic modulus, density, homogeneity, or grain structure. As such, acoustic frequency detection according to the present invention may utilize the range of frequencies from approximately 20 KHz to 2 Mhz, with most work being performed between 1000 KHz and 105 MHz, but in the illustrative case of carbon, will range from 4 MHz-105 MHz, all of which can be easily adjusted depending on the particular element being flagged as further discussed herein. Both longitudinal and shear (transverse) modes of vibration are commonly employed, as well as surface (Rayleigh) waves and plate (Lamb) waves in some specialized cases. Because shorter wavelengths are more responsive to changes in the medium through which they pass, many material analysis applications will benefit from using the highest frequency that the test piece will support. Sound pulses are normally generated and received after reflection, by piezoelectric transducers that have been acoustically coupled or are otherwise in proximity to target object 15. In most cases a single transducer 25 coupled or directed at one side of target object 15 serves as both transmitter and receiver (pulse/echo mode), although in some situations involving highly attenuating or scattering materials, separate transmitting and receiving transducers on opposite sides of the part may be used (through transmission mode). A sound wave is launched by exciting transducer 25 with a voltage spike or square wave. The sound wave travels through the test material, either reflecting off the far side to return to its point of origin (pulse/echo), or being received by another transducer at that point (through transmission). The received signal is then amplified and analyzed. A variety of commercial instrumentation is available for this purpose, utilizing both analog and digital signal processing.

A significant advantage of this novel acoustic frequency detection scanning over other material analysis methods is that it can often be performed in-process or on-line. High frequency sound waves can often be successfully transmitted into and out of moving materials without direct contact, through the use of a water bath, oil phase or water stream as a coupling medium. Measurements can also be performed within closed containers by coupling sound energy through the wall. Because sound waves penetrate through the test specimen, material properties are measured in bulk rather than just on the surface. It is sometimes even possible, through the use of selective gating, to analyze just one layer of a multi-layer, multi-material fabrication. The relevant measurement parameters will typically be one or more of the following:

(a) Sound velocity/pulse transit time: Sound velocity is usually the easiest acoustic frequency detection parameter to measure. The speed of sound in a homogenous medium is directly related to both elastic modulus and density; therefore, changes in either elasticity or density will affect pulse transit time through a sample of a given thickness. Additionally, varying degrees of non-homogeneity may have an effect on sound velocity.

(b) Attenuation: Sound energy is absorbed or attenuated at different rates in different materials, governed in a complex fashion by interactive effects of density, hardness, viscosity, and molecular structure. Attenuation normally increases with frequency in a given material.

(c) Scattering: Sound waves reflect from boundaries between dissimilar materials. Changes in grain structure, fiber orientation, porosity, particle concentration, and other micro-structural variations can affect the amplitude, direction, and frequency content of scattered signals. Scatter effects can also be monitored indirectly by looking at changes in the amplitude of a backwall echo or a through-transmission signal.

(d) Frequency (spectral) content: All materials tend to act to some degree as a low pass filter, attenuating or scattering the higher frequency components of a broadband sound wave more than the lower frequency components. Thus, analysis of changes in the remaining frequency content of a selected broadband pulse that has passed through the test material can track the combined effects of attenuation and scattering as described above.

In some applications, acoustic frequency detection data such as velocity can be directly used to calculate properties such as elastic modulus. In other cases, acoustic frequency detection testing is a comparative technique, where in order to establish a test protocol in a given application it will be necessary to experimentally evaluate reference standards representing the range of material conditions being quantified. From such standards it will be possible to record how sound transmission parameters vary with changes in specific material properties, and then from this baseline information it will be possible to identify or predict similar changes in test samples.

A wide variety of acoustic frequency detection variants can be used in the inventive material analysis applications. Sound velocity can be measured with simple hand-held acoustic frequency detection thickness gages, while velocity, attenuation, and scattering effects can all be observed with modern digital flaw detectors. Pulsar/receivers with appropriate auxiliary equipment and acoustic frequency detection imaging systems with appropriate software can be used to quantify all of these properties, and to perform spectrum analysis (frequency content) testing as well also on both instrumentation and transducer recommendations for specific tests can be achieved.

The following is a summary of some specific, presently known material analysis applications where acoustic frequency detection techniques may be employed within the context of the present invention:

Elastic modulus: Young's modulus and shear modulus in homogenous, non-dispersive materials can be calculated from longitudinal wave and shear wave velocity (along with material density). Use of specialized waveguides can permit measurement at high temperatures.

Nodularity in cast iron: Both the concentration of graphite in cast iron and its shape and form can be quantified through velocity measurements.

Cure rate in epoxies and concrete: The speed of sound in these materials changes as they harden, thus sound velocity measurements can be correlated to the degree of curing. Concrete testing usually requires access to both sides for through-transmission coupling.

Liquid concentrations: The mixture ratio of two liquids with dissimilar sound velocities can be correlated to the sound velocity of the solution at a given temperature.

Density of slurries: The liquid/solid mix ratio of slurries such as drilling mud and paper slurry at a given temperature can be correlated to sound velocity and/or attenuation.

Density in ceramics: Uniformity of density in both green and fired ceramics can be verified by means of sound velocity measurements.

Food products: A wide variety of tests have been reported, including age of eggs and potatoes, ripeness of fruits, fat content in beef, and percent of solids in milk. Generally, these tests are both nondestructive and non-contaminating.

Polymerization in plastics: In plastics and other polymers, variations in molecular structure such as length or orientation of polymer chains will often result in corresponding changes in sound velocity and/or attenuation.

Particle or porosity size and distribution: Changes in the size or distribution of particles or porosity in a solid or liquid medium will affect the amplitude and frequency of scattered acoustic frequency detection.

Grain size in metals: Changes in grain size or orientation in steel, cast iron, titanium, and other metals will cause changes in the amplitude, direction, and/or frequency content of scattered acoustic frequency detection.

Anisotropy in solids: Variations in sound velocity, scattering, and/or attenuation across different axes of a solid can be used to identify and quantify anisotropy, including molecular structure and electron scattering.

Case hardening depth in steel: High frequency shear wave backscatter techniques can be used to measure the depth of case hardening.

Illustrative of examples of acoustic detection devices that may be employed within the context of the present invention are as follows: (i) an acoustic frequency detection device, utilizing high frequency sound waves reflect from flaws in predictable ways, producing distinctive echo patterns that can be displayed and recorded by portable or stationary instruments, where sound waves, expressed as organized mechanical vibrations traveling through a solid, a liquid, or a gas medium such as those that might be found in target object 15. These waves will travel through a given medium at a specific speed or velocity, in a predictable direction, and when they encounter a boundary with a different medium they will be reflected or transmitted according to simple rule, but are completely nondestructive and safe; (ii) an acoustic frequency detection device where each of the sound waves generated oscillate at a specific frequency, or number of vibrations or cycles per second, which utilize frequencies between 500,000 and 10,000,000 cycles per second (500 KHz to 10 MHz). At frequencies in the megahertz range, sound energy does not travel efficiently through air or other gasses, but it travels freely through most liquids and common engineering materials and solids; (iii) an acoustic velocity based device where the speed of a sound wave varies depending on the medium through which it is traveling, affected by the medium's density and elastic properties. Different types of sound waves will travel at different velocities; and (iv) an acoustic wavelength-based device where any type of wave will have an associated wavelength, which is the distance between any two corresponding points in the wave cycle as it travels through a medium. Wavelength is related to frequency and velocity by the simple equation: $\lambda = c/f$ where: $\lambda$=wavelength; c=sound velocity; and f=frequency. Wavelength is a limiting factor that controls the amount of information that can be derived from the behavior of a wave. In the inventive acoustic frequency detection, the lower limit of detection for a discontinuity in target object 15 that can be recognized for effective flagging is one-half of the above-referenced wavelength because anything smaller than that will be invisible. In acoustic frequency detection thickness gauging, the theoretical minimum measurable thickness is one multiple of the above-referenced wavelength.

In terms one illustrative example of the novel method employed herein, and assuming the choice of an acoustic frequency detection based device, one essential step deserving of mention is that of comparative techniques. Using appropriate reference standards along with a knowledge of sound wave propagation and generally accepted acoustic test procedures, a trained operator identifies specific echo patterns corresponding to the echo response from target object portions without contraband, and from representative contraband that may be hidden therein. The echo pattern from a test piece may then be compared to the patterns from these calibration standards in order to determine its condition.

Straight beam testing may thereafter be employed as a step of preliminary testing, especially when the user intention is to avoid actually contacting the target object 15, by adjusting to the proper frequency for that application. More particularly, straight beam testing utilizing contact, delay line, dual element, or immersion transducers is generally employed to find discontinuities parallel to the surface of the test piece, as well as voids and porosity. It utilizes the basic principle that sound energy traveling through a medium will continue to propagate until it either disperses or reflects off a boundary with another material, such as the air surrounding a far wall or outside a target object 15. In this type of test, the operator couples transducer 25 to a test piece (not depicted) and locates the echo returning from the far wall of the test piece, and then looks for any echoes that arrive ahead of that back wall echo, discounting grain scatter noise if present. An acoustically significant echo that precedes the backwall echo implies the presence of a discontinuity (i.e., contraband) in target object 15. Through further analysis, the depth, size, and shape of the structure producing the reflection can be determined.

Consequently, sound energy will travel to the far side of a part of a specimen, but reflect earlier if a discontinuity is presented. This dynamic is altered in the present invention by designing the unit to a very specific frequency and wavelength, so as to prevent this reflection from happening, in order to detect molecular structure (such as the illustrative nitrogen) and therefore, so as to detect the elements that make up that given structure. Straight beam testing may be instituted as one part of the overall novel system herein to first ensure penetration of the container portion of target object 15. Once inside the container, the frequency and wavelength can be fined tuned to generate the desired distance for the wave to travel and consequently, for determining (once inside target object 15) the wavelength needed to ensure everything in the container is being captured and returned, but as alluded to above, this is predicated on ensuring proper penetration of the correct target object 15.

In some specialized cases, testing may be performed in a "through transmission mode", where sound energy travels between two transducers placed on opposite sides of the test piece. If a large discontinuity is present in the sound path, the beam will be obstructed and the sound pulse will not reach the receiver. The angled sound beam is highly sensitive to discontinuities perpendicular to the far surface of the test piece (first leg test) or, after bouncing off the far side, to discontinuities perpendicular to the coupling surface (second leg test). A variety of specific beam angles and probe positions are used to accommodate different part geometries and discontinuities types, and these are described in detail in appropriate inspection codes and procedures.

Crystalline Material Preparation for Oil/Water Suspension Embodiment and Crystalline Structure Embodiment Various types of ceramic crystals may be employed within the present invention. However, for maximizing both the propagation and return of the output signal from the resultant crystalline based transducer, in one embodiment, a ferroelectric ceramic compound having the composition of the following formula of: $s[L]-x[P]y[M]z[N]p[T]$. The illustrative ferroelectric ceramic crystals according to the present invention are relax or ferroelectrics having high piezoelectricity, a high electromechanical coefficient and a high electro-optical coefficient, and are particularly amenable to maximizing the performance of the novel acoustic wave device, especially when the system is not actually physically contacting the target object. The process of preparing the single crystal according to the present invention enables preparation of crystals having a diameter of various proportions, starting at approximately less than 1 mm or less, with uniform composition across the dispersal. In the above formula, [P] is lead oxide, [M] is magnesium oxide or zinc oxide, [N] is niobium oxide, [T] is titanium oxide, [L] is one selected from the group consisting of lithium tantalate or lithium niobate, lithium, lithium oxide, platinum, indium, palladium, rhodium, nickel, cobalt, iron, strontium, scandium, ruthenium, copper, yttrium, and ytterbium or mixtures thereof, and x, y, z, p and s are defined as $0.55<x<0.60$, $0.09<y<0.20$, $0.09<z<0.20$, $0.01<p<0.27$ and $0.01<s<0.1$, respectively. The size of such particles is illustratively described as being between diameter 1 and 10 μm, especially 1 and 5 μm, particularly 1 and 3 μm, when prepared with an exemplary method such as ultrasonic radiation.

Piezo-ceramic materials are categorized as functional ceramics, and when placed in the transmit/receive array of wand 21 as sensors, the aforementioned unique ceramic composition makes it possible to convert forces, pressures and accelerations into electrical signals. In the case of sonic and ultrasonic transducers and actuators, the ceramic composition converts electric voltages into vibrations or deformations and/or sound waves into electromagnetic wave, and has great variability in adjusting to any desired frequency. It is this wave that will carry information needed to analyze further once the conversion via the transducer is done. Depending on the specific field of use of the present application (e.g., whether target objects such as scanning luggage versus automobiles, and whether flagging materials such as nitrogen based explosives versus carbon based smuggled gems), the piezo-ceramic materials may differ. To this end, it is noted that piezo-ceramic materials, while generally classified according to their chemical composition, the specific application conditions may similarly govern their specific selection for use in wand tip 21. The particular piezo-ceramic may also be chosen in one embodiment because of its crystal size, and the optimal size may be is determined by matching the crystal size with the flagged element of targeted contraband within a target object. For example, most explosives are carbon based, and when flagging carbon, the molecular size of carbon is such that it best responds to frequencies in the range of approximately 100.58 MHz for solid/liquid forms. Given this, piezo-ceramics such as PZT ceramics are ideal because their crystal size is generally very small, and this feature provides much more surface area and as a result, a very stable focused beam and furthermore, also helps to stabilize the acoustic wave being transmitted, as well as making it easier to control this dynamic therefore produces an optimized return reflection to wand tip 21 by setting the strength of the detector by fine tuning so that once the beam penetrates target object 15 (i.e. a bag, luggage, container, or a person) the user can adjust and control the same so as to spread out once it penetrates the inside of target object 15, into a size however large or small as may be desired. Consequently, the user can control both how far the beam (acoustic wave) travels, and where it rebounds back. This function involves a feature called a cyclical waveform, an aspect that also carries the frequency along with it during transmission. As previously discussed, because frequency and waveform are inverse operations from one another, if the velocity of the sound wave is known, the frequency can be calculated once the waveform returns, or vice a versa. This dynamic may be illustratively applied in the case of say, scanning for smuggled gems. In such a case, one might optimize the present invention by flagging carbon, sulfur and potassium, instead of carbon alone, because this combination of elements being detected would be one example of elements of interest, which also defines the molecular specificity of compounds of interest. In this way, the present invention can be shown to be done at both the atomic and molecular levels. This field of application might further be customized by utilizing crystals such as quartz because this mineral has a surface area that maximizes the proper output and input from in relation to the target element, which in this case, has a size of less than 0.1 micrometers.

Further to the above, aggregate crystal surface area is a key factor in optimization. The smaller the crystals, the greater the surface area realized, and this is an important factor in creating an optimal contraction of crystals in order to achieve a very wide range of acoustic frequencies and wavelengths that will encompass the entire area being detected and analyzed. Subsequently, the proper frequency and wavelength to penetrate target object 15, such as luggage, can now be adjusted so that the proper area therein is being completely analyzed. Some additional, illustrative parameters that may factor on the selection of the particular on piezo-ceramic properties are as listed as follows:

| Selection of Piezo-ceramic Properties | | | |
|---|---|---|---|
| | Power transducers | Sensors | Actuators |
| Relative permittivity $\varepsilon_{33}\,\tau/\varepsilon^0$ | 1,000-1,300 | 1,500-1,850 | 1,800-3,800 |
| Loss factor tan $\delta$ | $2 \times 10^{-3}$-$3 \times 10^{-3}$ | $12 \times 10^{-3}$-$20 \times 10^{-3}$ | $15 \times 10^{-3}$-$16 \times 10^{-3}$ |
| Frequency constant $N_P$, KHz · mm | 2,210-2,280 | 2,020-2,050 | 1,960-2,010 |
| Coupling factor $k_P$ | 0.55-0.57 | 0.59-0.62 | 0.65 |
| Charge constant $d^{33}$, $10^{-12}$ C/N | 240-310 | 390-450 | 475-680 |
| Voltage constant $g_{33}$, $10^{-3}$ Vm/N | 26.9-27.1 | 26.9-33.1 | 20.2-28.5 |
| Elastic compliance $S_{11}^{\varepsilon}$, $10^{-12}$ m$^2$/N | 11.4-14.9 | 16.3-18.5 | 15.8-17.9 |
| Elastic stiffness $C_{33}^{D}$, $10^{10}$ N/m$^2$ | 15.9-16.2 | 14.5-15.8 | 14.7-15.2 |
| Density g/cm$^2$ | 7.65-7.70 | 7.65-7.80 | 7.70-7.83 |
| Quality $Q_m$ | 500-1,000 | 60-90 | 75-80 |
| Aging rate $C_{\varepsilon}$, % | −4.5 to −3.0 | −2.3 to −0.3 | −1.6 to −0.8 |

Once prepared, the particulate matter may be formed as a crystalline surface structure embodiment, as discussed below, or as a crystalline oil suspension embodiment wherein the prepared crystals are prepared as particulates to be suspended by use of a mixing means, with oil to prepare the crystalline oil suspension. Various amounts of crystal particulates (piezoelectric ceramic) maybe mixed into the oil, with the understanding that in one embodiment, greater relative amounts of crystalline particulates to oil may be preferred in order to maximize the "push" (squeeze) effect of the damper(s) 64 element(s) on the suspended crystals as described herein. Specifically, with an illustrative amount of say, 2 gm of particulate matter mixed with say, 25 mL of oil will result in >10%, and more preferentially, between 40-85% reduction in interstitial space between the suspended particulate matter (crystals) when voltage is applied. This measure of damping effect (termed herein as a novel "interstitial reduction") helps mitigate unwanted effects resulting from attenuation. Essentially, the attenuation effects incumbent upon the acoustic waves interacting with the crystals in between damping elements, such that when voltage is applied, the damping element(s) will squeeze the crystals such that any interstitial spaces will be minimized. Many different oils may be employed, but illustratively one type of oil that maybe employed is crude oil light, having a viscosity between 10 cp and 100 cp. Most preferably the mixing means should be non-grinding e.g. a non-grinding magnetic stirrer or an overhead stirrer (particularly a non-grinding magnetic stirrer). Desirably, stirring speed will be set at a level that gives efficient mixing in the mixing chamber, but without inducing vortex effects. Vortex effects are undesirable since they may cause particle size reduction through liquid micronization-like processes.

After the crystalline oil or water suspension has been prepared, it (or at least just the oil, as described in the alternative embodiment above) must be encapsulated in a polymer casing, thereby forming the encapsulation that comprises the tip of wand 21 seen in FIG. 2A. Whether provided as a piezoelectric ceramic layer in the "crystalline surface structure embodiment" as described below, or as a piezoelectric ceramic mixed within as in the "encapsulated oil/water suspension embodiment" of the crystalline oil/water suspension, the encapsulation and any crystalline preparation is appurtenant (physically and/or electronically in connection with transducer 25). In one alternative embodiment, the crystalline oil encapsulation maybe made as a "swappable medium module" that may be easily replaced (swapped) out from the tip of wand 21 by a user, where the user desires to replace worn out or broken crystalline oil/water encapsulation, or in one illustrative embodiment, desires to swap out one crystalline oil/water encapsulation with another crystalline oil/water encapsulation based upon the particular characteristics of the given piezo-ceramics in the crystalline oil/water encapsulation. By way of example, where inventive device 20 is being used to detect or flag carbon (for explosives detection) and then the user needs to employ inventive device 20 for say, gem smuggling detection (carbon flagging), then the swappable medium module feature may be employed, whereby the crystalline oil/carbon encapsulation having crystals such as ceramic (e.g., piezo-ceramic materials that have been specifically optimized for carbon flagging) in the oil suspension may be swapped out for the crystalline oil encapsulation having crystals such as quartz (e.g., piezo-ceramic materials that have been specifically optimized for carbon flagging). In either case, by way of just one illustrative embodiment the fabrication of pertaining to tip of wand 20, oil such as any standard commercial oil having a viscosity between 10 and 100 centipose as a medium, and with the aforementioned piezo-ceramic crystals suspended therein, the resulting suspension may be encapsulated on top of a mesh interface to create a specific piezoelectric effect that will differ from ordinary, known piezo results. Note that the piezo-ceramics in the crystalline oil encapsulation are, in one embodiment, used for three specific functions, namely: (i) transducer medium; (ii) actuator medium (e.g., propagating or transmitting the acoustic waves to target object 20); and (iii) sensor array medium (e.g., receiving reflected or returned the acoustic waves from target object 20).

Alternatively, the above effects may also be achieved in one variant of the present invention through the use of the preparation pertaining to the crystals and oil or water of the aforementioned "encapsulated oil suspension embodiment", but without the crystalline material being suspended therein. In such an alternative embodiment (hereby termed the "crystalline surface structure embodiment" or "unadulterated oil encapsulation embodiment"), the crystalline production as described above may instead be formed as a substantially continuous, formed layer at tip 68 of wand 20 which forms a crystalline surface structure that is adjacent to a separate oil or water encapsulation that is similar to the previously described oil/water suspension encapsulation, but is an unadulterated oil/water encapsulation that contains zero or almost zero particulate materials suspended therein. This layer (not depicted) may be of various diameters of width and thickness, depending on the field of application. In the above-described field, one illustrative embodiment might have approximately 1.5 inches of thickness and a diameter of such dimensions that it reflects the multiple of wavelengths being propagated and/or captured. Either way, this layer also has damper 64 adjacent (typically abutting one end of the layer, opposite the side of the layer where the unadulterated oil encapsulation abuts the layer) so that the "interstitial reduction" as described above. Provision of this permits the beneficial acoustic wave processing properties of the crystalline materials acting in concert with the oil, whereby the propagation and reception of such waves are magnified in such a way so as to afford the superior detection of discontinuities such as nitrogen or the like in target object 15.

In terms of fields of use, the novel system and method will be particularly useful in airports to send a signal right through a luggage bag or on a person to detect for carbon and other elements, For example, charcoal (which largely contains carbon), sulfur and potassium nitrate together are the ingredients of gunpowder. It is this type of molecular specificity we are after. However, other fields of use might include: (i) military; (ii) police; (iii) security used at stadiums or at large events, large office buildings, theaters, etc., where the novel device can protect citizens from explosive devices or other threats. It is noted that the above fields of use may entail both stationary and mobile variants of the present invention. To this end, a mobile variant (or even the stationary variant) may utilize convenient structural features such as adjustable swing arms, user operated detachable wands where wand 21 is detachable from acoustic wave detector 20 and internally powered or otherwise rechargeable and fully in communication with acoustic wave detector 20 via wireless communication modules.

While the methods contained herein constitute preferred embodiments of the invention, it is to be understood that the invention is not limited to these precise methods, and that changes may be made therein without departing from the scope of the invention which is defined in the appended claims.

What is claimed is:

1. A method of non-destructively identifying elements, said method comprising:
    generating at least one ultrasonic pulse output wave from a crystalline based transducer;
    directing said at least one ultrasonic pulse output wave at a target;
    collecting at least one echo, wherein said at least one echo results from said at least one ultrasonic pulse output wave reflecting from said target utilizing special purpose circuitry, said special purpose circuitry acquiring a multitude of amplitudes from at least one atom of said target;
        the method further comprising a conversion of at least one said echo results into an element identification assignment based upon converting said multitude amplitudes into a spectrum of frequencies from at least one particle of a target, further comprising the steps of:
        analyzing, through said special purpose signal processing assembly, said multitude of amplitudes within said at least one echo results so as to compute a unique frequency for each one of said multitude of amplitudes within said at least one echo results;
        parsing each one of said at least one echo results respectively into at least one separate frequency bands;
        comparing each of said frequency bands with at least one predetermined baseline band for at least one element identification assignment; and
        outputting at least one element identification assignment, when a given said frequency band has a value that is within a predetermined range of a given said baseline band for a given element.

2. The method of claim 1, further comprising usage of signatures with multi-dimensional data fidelity.

3. The method of claim 2, further comprising using special purpose circuitry for enabling bifurcated double verification during a detection of signatures and identification of predetermined elements that if detected, generate an alarm.

4. The method of claim 3, said step of converting said multitude amplitudes into a spectrum of frequencies from at least one particle of a target further including a spectral analysis step including at least one of the following steps of executing: Pwelch functions, fast Fourier transformations, vector functions, or wavelet functions.

5. The method of claim 4, further including the building of a reference library.

6. A device for non-destructively identifying elements, said device comprising:
    a pulse generator, said pulse generator generating at least one ultrasonic pulse output wave from a crystalline based transducer to a target;
    a collector, said collector collecting at least one echo, wherein said at least one echo results from said at least one ultrasonic pulse output wave reflecting from said target, said collector further including special purpose circuitry for acquiring a multitude of amplitudes from at least one particle of said target;
    the special purpose circuitry further comprising a converter, said converter converting said multitude of amplitudes into a spectrum of frequencies, said special purpose circuitry further comprising the components of:
    an analyzer that analyzes said multitude of amplitudes within said at least one echo results so as to compute a unique frequency for each one of said multitude of amplitudes within said at least one echo results, and that parses each one of said at least one echo results respectively into at least one separate frequency band;
    a comparison module, said comparison module comparing said frequency bands with at least one predetermined baseline band for at least one element identification assignment and for outputting at least one element identification assignment, when a given said frequency band has a value that is within a predetermined range of a given said baseline band for a given element.

7. The device of claim 6, further comprising a signature generator for generating signatures with multi-dimensional data fidelity.

8. The device of claim 7, further comprising a bifurcated double verification special purpose circuitry for that detects signatures and identifies predetermined elements that if detected, generate an alarm.

9. The device of claim 8, said converter includes spectral analysis circuitry having processing applications including at least one of the following of: Pwelch functions, fast Fourier transformations, vector functions, or wavelet functions.

10. The device of claim 9, further including a signature library.

* * * * *